United States Patent
Lewczynski et al.

(10) Patent No.: US 11,458,809 B2
(45) Date of Patent: Oct. 4, 2022

(54) APPARATUS AND METHOD FOR CONTROLLING THE DISTRIBUTION OF AIR IN AN HVAC SYSTEM

(71) Applicant: Ford Global Technologies, LLC, Dearborn, MI (US)

(72) Inventors: Ian Thomas Lewczynski, Livonia, MI (US); Steven Michael Kahrs, Canton, MI (US); David Ballheim, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 16/524,483

(22) Filed: Jul. 29, 2019

(65) Prior Publication Data

US 2021/0031591 A1  Feb. 4, 2021

(51) Int. Cl.
  *B60H 1/24*  (2006.01)
  *B60H 1/00*  (2006.01)

(52) U.S. Cl.
  CPC ..... *B60H 1/00871* (2013.01); *B60H 1/00021* (2013.01); *B60H 2001/00185* (2013.01); *B60H 2001/00707* (2013.01); *B60H 2001/00721* (2013.01)

(58) Field of Classification Search
  CPC ...... B60H 1/00021; B60H 2001/00185; B60H 2001/00221; B60H 2001/00707; B60H 2001/00721; B60H 2001/002
  USPC .......................................... 454/143–145, 152
  See application file for complete search history.

(56) References Cited

U.S. PATENT DOCUMENTS

| | | | |
|---|---|---|---|
| 4,361,170 A | 11/1982 | Peloza | |
| 4,482,009 A | 11/1984 | Nishimura et al. | |
| 4,519,302 A * | 5/1985 | Nilsson | B60H 1/00042 137/625.46 |
| 5,329,970 A | 7/1994 | Squirrell | |
| 5,394,860 A | 3/1995 | Borle | |
| 6,206,092 B1 | 3/2001 | Beck et al. | |
| 6,415,851 B1 | 7/2002 | Hall et al. | |
| 6,607,029 B2 * | 8/2003 | Danieau | B60H 1/00021 165/203 |
| 6,959,754 B2 | 11/2005 | Lee et al. | |
| 8,857,179 B2 * | 10/2014 | Kado | F16K 11/0525 60/605.1 |
| 9,248,719 B2 | 2/2016 | Kang et al. | |
| 10,272,744 B2 | 4/2019 | Sawyer et al. | |
| 2007/0137833 A1 | 6/2007 | Kang et al. | |

(Continued)

FOREIGN PATENT DOCUMENTS

EP  1205321 A2  5/2002

OTHER PUBLICATIONS

US Duct—Heavy Duty Butterfly, "The Complete Duct Source," at least as early as Jul. 28, 2018 (1 page).

*Primary Examiner* — Ko-Wei Lin
(74) *Attorney, Agent, or Firm* — Vichit Chea; Price Heneveld LLP (57) ABSTRACT

An air distribution plenum for controlling air flow in a vehicle HVAC system includes an air inlet and first and second air outlets. A movable member substantially blocks the first and second air outlets when in a first position, blocks only the first air outlet in a second position, blocks only the second air outlet in a third position, and permits air to flow through both the first and second air outlets when in a fourth position.

20 Claims, 6 Drawing Sheets

(56) References Cited

U.S. PATENT DOCUMENTS

2009/0007978 A1 1/2009 Alston et al.
2017/0066304 A1 3/2017 Sawyer et al.
2020/0148030 A1* 5/2020 Torok ................. B60H 1/00028

* cited by examiner

APPARATUS AND METHOD FOR CONTROLLING THE DISTRIBUTION OF AIR IN AN HVAC SYSTEM

FIELD OF THE INVENTION

The present invention generally relates to vehicle HVAC systems, and in particular to a plenum for vehicle HVAC systems.

BACKGROUND OF THE INVENTION

In vehicle HVAC systems, air flowing within the HVAC system may be directed to one or more air outlets of the HVAC system for purposes of heating or cooling vehicle occupants. Vehicle HVAC systems may include various dampers and/or doors to direct air to specific outlets.

SUMMARY OF THE INVENTION

One aspect of the present disclosure is an air distribution plenum for vehicle ventilation systems. The air distribution plenum includes a housing having an interior space, an air inlet opening fluidly connected to the interior space, and first and second outlet openings fluidly connected to the interior space. The air distribution plenum includes a movable member or door at least partially disposed in the interior space of the housing. The door is configured to pivot between first, second, third, and fourth positions. The air distribution plenum preferably includes a powered actuator such as an electric motor that is operably connected to the door for moving the door to the first, second, third, and fourth positions. When the door is in the first position, the door substantially blocks air from flowing out of the air distribution plenum through the first and second air outlet openings. When the door is in the second position, the door substantially blocks air flowing into the air distribution plenum through the air inlet opening from flowing through the first air outlet opening, and fluidly connects the air inlet opening and the second air outlet opening to permit air flowing through the air inlet opening to flow out of the air distribution plenum through the second air outlet opening. When the door is in the third position, the door substantially blocks air entering the air inlet opening from flowing through the second air outlet opening, and fluidly connects the air inlet opening and first air outlet opening to permit air flowing through the air inlet to flow out of the air distribution plenum through the first air outlet opening. When the door is in the fourth position, the door fluidly connects the air inlet opening to the first and second air outlet openings to permit air flowing into the air distribution plenum through the air inlet to flow out of the air distribution plenum through the first and second air outlets.

Embodiments of the first aspect of the disclosure can include any one or a combination of the following features:

The housing may optionally include opposite upstream and downstream sides, and the inlet opening of the housing and the first outlet opening of the housing may be disposed on the upstream and downstream sides of the housing, respectively.

The second outlet opening may be disposed on a side of the housing transverse to the upstream and downstream sides of the housing.

The door may define an upstream edge, a downstream edge opposite the upstream edge, and a central portion between the upstream edge and the downstream edge, and the door may pivot about an axis extending through the central portion.

The housing may include a concave interior surface disposed between the first and second air outlet openings.

The downstream edge of the door may be positioned directly adjacent the concave interior surface when the door is in the fourth position.

The concave interior surface may be substantially cylindrical.

The upstream edge of the door may be disposed directly adjacent a central portion of the air inlet opening when the door is in the fourth position whereby air flowing through the air inlet opening is split into first and second streams of air by the door.

The door may be substantially planar, and may include a substantially rectangular peripheral edge.

The housing may include upstream and downstream sidewalls and first and second opposite sidewalls extending between the upstream and downstream sidewalls.

The first and second opposite sidewalls may include inwardly-extending engagement surfaces that engage the door adjacent the peripheral edge of the door when the door is in the first and fourth positions to form a seal along at least a portion of the peripheral edge of the door.

The door may comprise a first door, the electric motor may comprise a first electric motor, and the air distribution plenum may further include a second door and a second electrical motor operably connected to the second door, The housing may include a divider wall dividing the interior space into first and second interior spaces.

The first and second interior spaces may be fluidly connected to the air inlet opening, and the first and second air outlets may be fluidly connected to the first interior space.

The housing may further include third and fourth air outlet openings fluidly connected to the second interior space.

The first door may be disposed in the first interior space, and the second door may be disposed in the second interior space.

The second electric motor may be configured to move the second door to first, second, third, and fourth positions to selectively block both the third and fourth air outlet openings, block only a selected one of the third and fourth air outlet openings, and permit air flow out through both the first and second air outlet openings, respectively.

The first and second interior spaces may have substantially the same sizes and shapes, and the first and second doors may have substantially the same sizes and shapes.

Another aspect of the present disclosure is a ventilation system for motor vehicles including a HVAC unit configured to provide heated and/or cooled air. An air duct extends from the HVAC unit, and an air distribution plenum has an air inlet fluidly connected to the air duct. The air distribution plenum includes first and second air outlet openings. The air distribution plenum includes a movable member that is configured to when in a first position, substantially block both the first and second air outlet openings and, when in a second position, block only the first air outlet opening, and when in a third position, block only the second air outlet opening, and when in a fourth position, permit air to flow through both the first and second air outlet openings.

Embodiments of the second aspect of the disclosure can include any one or a combination of the following features:

The first air outlet opening may be fluidly connected to a panel vent.

The second air outlet opening may be fluidly connected to a floor vent that is positioned at a lower height than the panel vent.

The ventilation system may include a powered actuator such as an electric motor that is operably connected to the movable member.

The system may include a controller that is operably connected to the electric motor.

The controller may be configured to cause the electric motor to move the movable member to the first, second, third, and fourth positions.

The system may include at least one forward duct fluidly connected to the HVAC unit for supplying air from the HVAC unit to one or more front row seats of a vehicle.

The ventilation system may include a duct configured to supply air from the HVAC unit to second row seating vents of a motor vehicle.

The air distribution plenum may include a housing having an interior space.

The movable member may comprise a first door.

The electric motor may comprise a first electric motor, and the air distribution plenum may further include a second door and a second electrical motor operably connected to the second door.

The housing may include a divider wall dividing the interior space into first and second interior spaces.

The first and second interior spaces may be fluidly connected to the air inlet opening, and the first and second air outlets may be fluidly connected to the first interior space.

The housing may further include third and fourth air outlet openings fluidly connected to the second interior space.

The first door may be disposed in the first interior space, and the second door may be disposed in the second interior space.

The second electric motor may be configured to move the second door to first, second, third, and fourth positions to selectively block both the third and fourth air outlet openings, block only a selected one of the third and fourth air outlet openings, and permit air flow out through both the first and second air outlet openings, respectively.

The first, second, third, and fourth outlet openings may be configured to supply air from the HVAC unit to a second row of seats of a motor vehicle that is located rearwardly of a first row of seats.

Another aspect of the present disclosure is a motor vehicle having a passenger compartment and a first row of seats and a second row of seats disposed rearwardly of the first row of seats, wherein the first and second rows of seats are disposed in the passenger compartment. A ventilation system includes a HVAC unit positioned in front of the first row seats. An air duct extends from the HVAC unit, and an air distribution plenum has an air inlet fluidly connected to the air duct. The air distribution plenum includes first and second air outlet openings. The air distribution plenum includes a movable member that is configured to substantially block both the first and second air outlet openings when the movable member is in a first position, block only the first air outlet opening when the movable member is in a second position, block only the second air outlet opening when the movable member is in a third position, and permit air to flow through both the first and second air outlet openings when the movable member is in a fourth position.

Embodiments of the third aspect of the disclosure can include any one or a combination of the following features:

The motor vehicle may include a center console structure extending through a central portion of the passenger compartment.

The air duct may be disposed in the center console structure.

The air distribution plenum may include four air outlet openings that are fluidly connected to the air inlet.

The air distribution plenum may be configured to permit air to flow out of 1) only a selected one of the four air outlet openings, 2) any two of the four air outlet openings, 3) any three of the four air outlet openings, and 4) to simultaneously block air flow out of all four air outlet openings.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
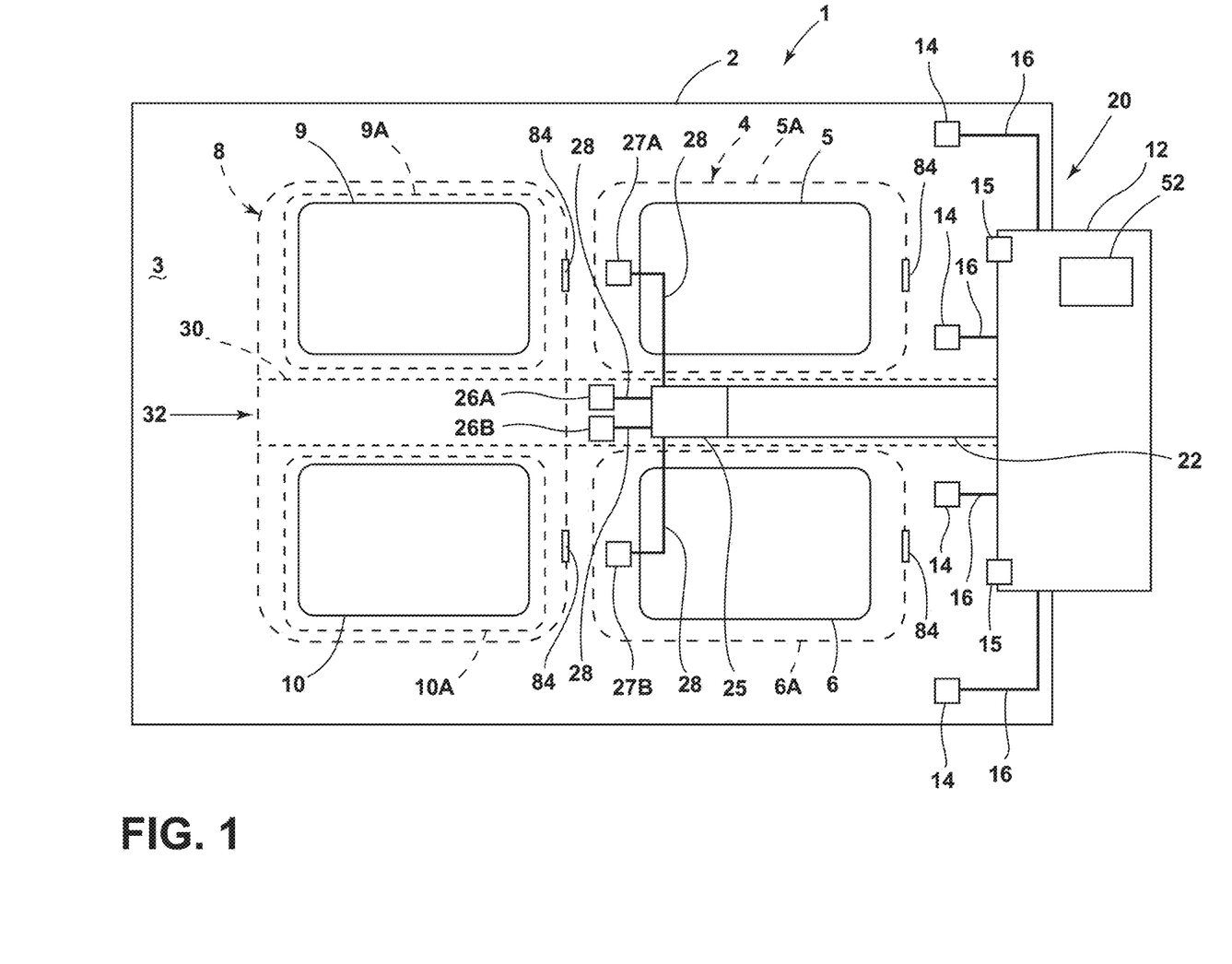
FIG. 1 is a schematic plan view of a motor vehicle including a HVAC system and air distribution plenum according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 may include a body structure 2 forming an interior passenger space 3. A first row 4 of seating may include a driver's side seat 5 and a passenger seat 6 with driver and corresponding passenger ventilation zones 5A and 6A, respectively. Alternatively, front seats 5, 6 may form a single front zone. A second row 8 of seating may include driver and passenger side seats 9 and 10, respectively, with corresponding ventilation zones 9A and 10A, respectively. A Heating, Ventilation, and Air Conditioning (HVAC) unit 12 may be disposed in front of the first row of seats 4, and may supply heated and cooled air to one or more panel outlets or vents 14 and/or floor outlets or vents 15. HVAC unit 12 may comprise virtually any suitable unit capable of providing conditioned air that has been heated and/or cooled as required for a particular application. In general, conditioned air may comprise air that is a) cooled and dehumidified, b) cooled/dehumidified and reheated, or c) heated to provide either a specific discharge air temperature and/or cabin air temperature. It will be understood that HVAC unit 12 may be configured to simultaneously provide both heated and cooled air to selected ones of ventilation zones 5A, 6A, 9A, 10A, etc. The outlets 14 and/or 15 may be fluidly connected to the HVAC unit 12 by one or more ducts 16 in a known manner. HVAC unit 12 may comprise virtually any suitable type of unit as required for a particular application. It will be understood that vehicle 1 may include a motor, drive train, wheels, suspension, and other components that are not shown in FIG. 1.

The HVAC system 20 may include a second row air duct 22 extending from the HVAC unit 12 to an air distribution plenum 25 to supply heated and/or cooled air from HVAC unit 12 to air distribution plenum 25. HVAC unit 12 may include a blower (not shown) of a known type that pressurizes the heated or cooled air and causes the air to flow into and through second row air duct 22. The air distribution plenum 25 may be configured to supply air from second row duct 22 to one or more rear panel (upper) outlets or vents 26A, 26B and floor outlets or vents 27A, 27B. The air distribution plenum 25 may be fluidly connected to the outlets 26A, 26B and 27A, 27B by one or more ducts 28. It will be understood that the number and location of ducts 28 and/or outlets or vents 26A, 26B, 27A, 27B, etc. may vary depending on the requirements of a particular application. Vehicle 1 may optionally include a center console structure 30 extending through a central portion 32 of the passenger space 3. The second row duct 22 may be disposed in the center console structure 30. The center console structure 30 may comprise a raised floor tunnel or the like, and second row duct 22 may be covered (hidden) by the console structure 30.

Figure 2:
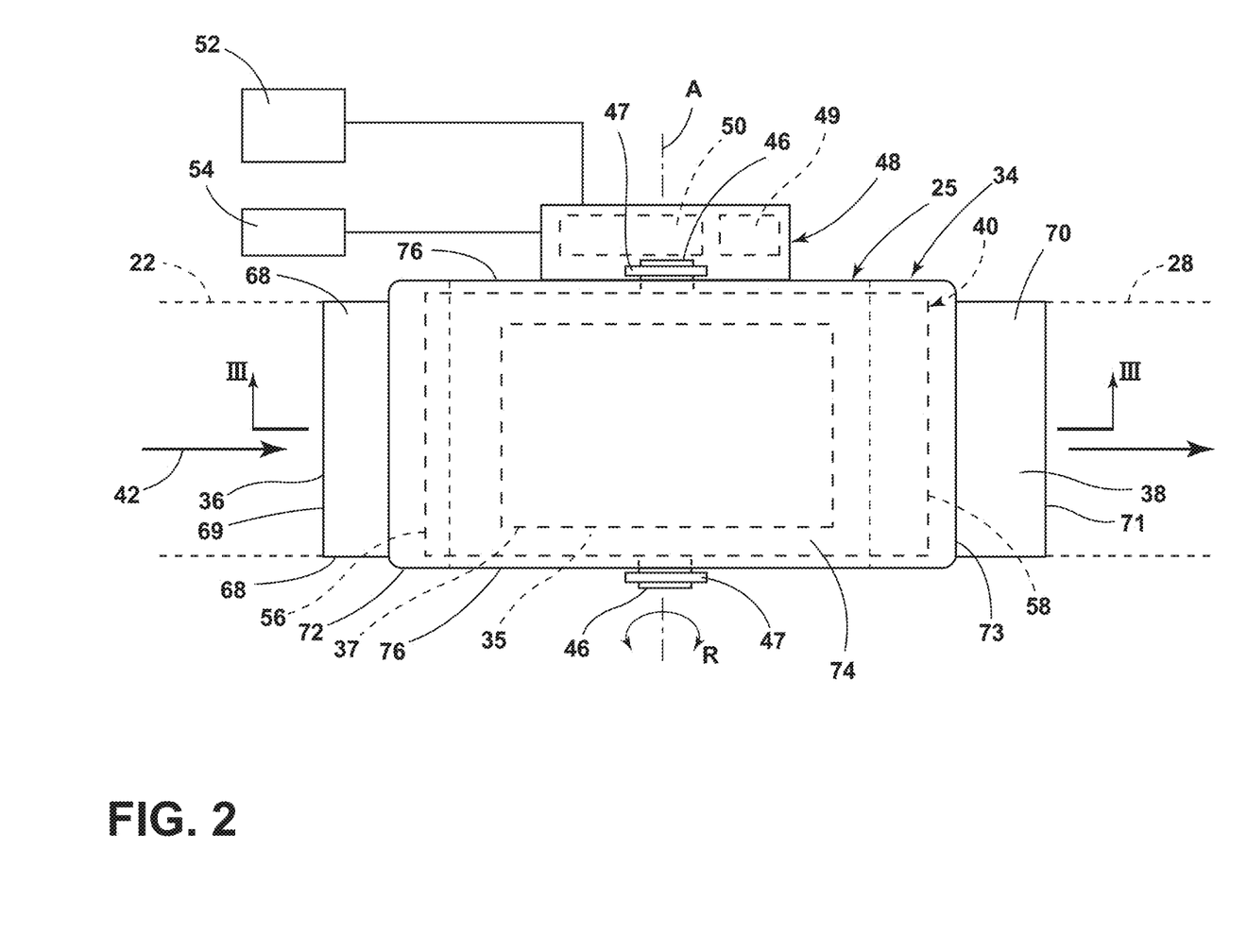
FIG. 2 is a partially schematic plan view of an air distribution plenum according to one aspect of the present disclosure.
Figure 3:
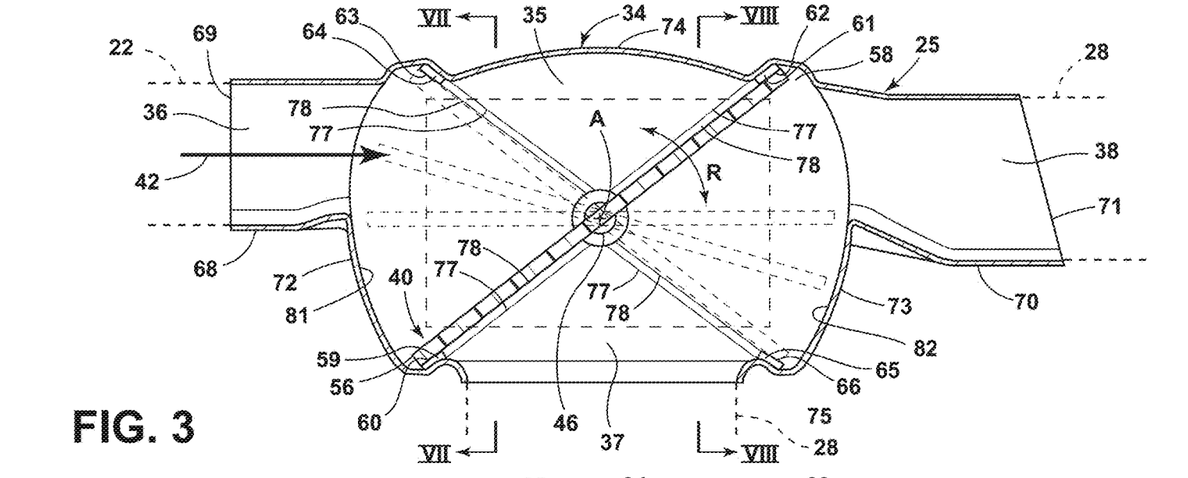
FIG. 3 is a cross-sectional view of the air distribution plenum of FIG. 2 showing the door in a first position.
Figure 4:
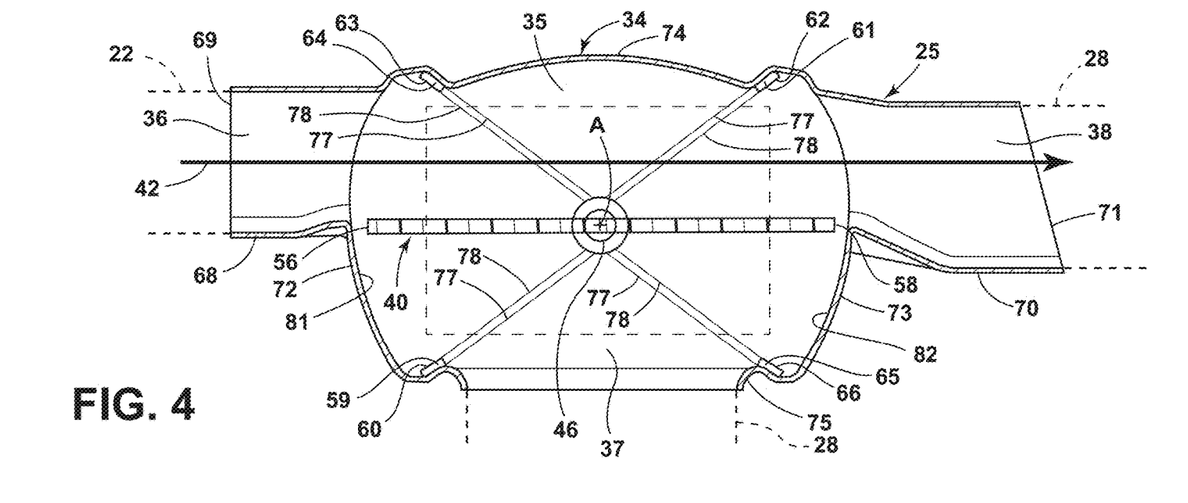
FIG. 4 is a cross-sectional view of the air distribution plenum of FIG. 2 showing the door in a second position.

With further reference to FIGS. 2 and 3, air distribution plenum 25 includes a housing 34 having an interior space 35 that is fluidly connected to an air inlet opening 36, a first air outlet opening 37, and a second air outlet opening 38. A movable member such as a door 40 is movably disposed in the interior space 35 of housing 34 to control flow of air from air inlet opening 36 to first and/or second air outlet openings 37, 38. As discussed in more detail below, when door 40 is in a first position (FIG. 3), door 40 blocks air 42 entering air inlet opening 36 and prevents flow of air 42 out through first and second air outlet openings 37, 38. When the door 40 is in a second position (FIG. 4), air 42 flows into air inlet opening 36, through interior space 35, and out through second air outlet opening 38. When door 40 is in a third position (FIG. 5), air 42 flows into air inlet opening 36, through interior space 35, and out through first air outlet opening 37. When door 40 is in a fourth position (FIG. 6), air 42 is split into first and second streams of air 43 and 44, respectively, and exits through first and second air outlet openings 37 and 38, respectively.

Referring again to FIGS. 2 and 3, door 40 is pivotally connected to the housing 34 for rotation about an axis "A." Door 40 may include pins 46 that rotatably engage bearings 47 of housing 34. An electrically-powered drive unit 48 may include an electric motor 49 and gears 50. The electric motor 49 and gears 50 may comprise conventional devices, such that a detailed description is not believed to be required. The electrically-powered drive unit 48 may be operably connected to a controller 52 and an electric power source such as a battery 54. Controller 52 may comprise a component of the HVAC unit 12 (FIG. 1) or other suitable control unit.

Door 40 includes a leading edge 56 and a trailing edge 58. When door 40 is in the first position (FIG. 3), a portion of door 40 directly adjacent the leading edge 56 may abut a stop structure including a resilient pad or strip 59 (see also FIG. 4) disposed on a stop surface 60 of housing 34, and trailing edge 58 may engage a stop structure including a resilient pad or strip 61 disposed on a stop surface 62 of housing 34. The resilient pads 59, 61, and stop surfaces 60 and 62 may be configured to prevent rotation of door 40 in a counterclockwise direction beyond the first position shown in FIG. 3. The resilient pads 59 and 61 may comprise elongated strips extending along the stop surfaces 60 and 62, respectively, to provide an airtight seal between the leading and trailing edges 56 and 58, respectively, and the stop surfaces 60 and 62, respectively. Similarly, housing 34 may include resilient pads or strips 63 and 65 that are disposed on stop surfaces 64 and 66, respectively, to seal the leading With reference to FIGS. 2, 3, and 7, air inlet opening 36 may be formed by a tubular portion 68 of housing 34, and may optionally have a generally quadrilateral cross-sectional shape. The end 69 of tubular portion 68 may be configured to provide a slip joint or butt joint (not shown) in a known manner to connect to the second row duct 22. Similarly, air outlet opening 38 may comprise a tubular portion 70 of housing 34 and may optionally have a generally quadrilateral cross-sectional shape. End 71 of tubular portion 70 may be configured to connect to one or more ducts 28 by a slip fit or other suitable arrangement (FIG. 8). Similarly, with reference to FIG. 2, first air outlet opening 37 may have a rectangular shape and be configured to provide a slip or butt joint connection to ducts 28.

Figure 5:
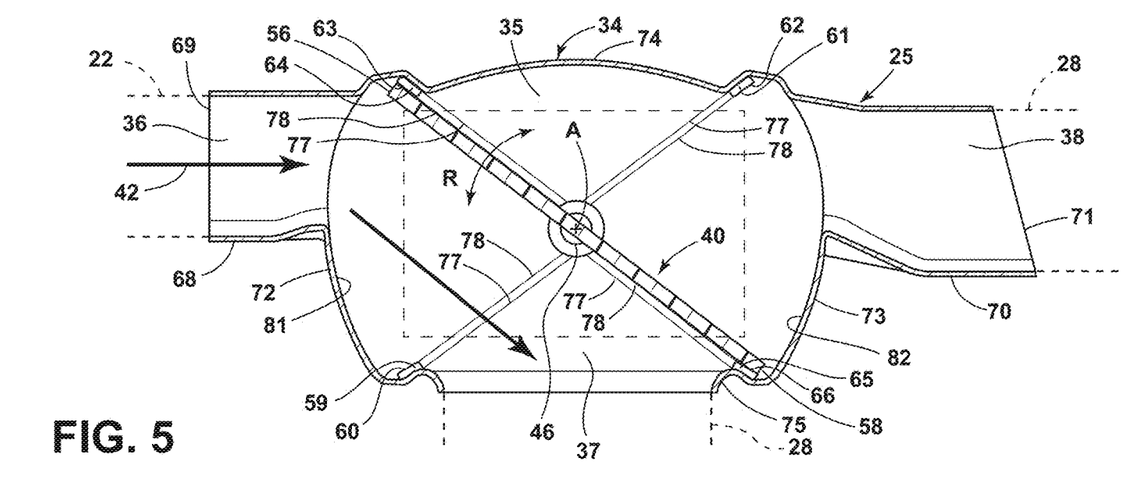
FIG. 5 is a cross-sectional view of the air distribution plenum of FIG. 2 showing the door in a third position.
Figure 6:
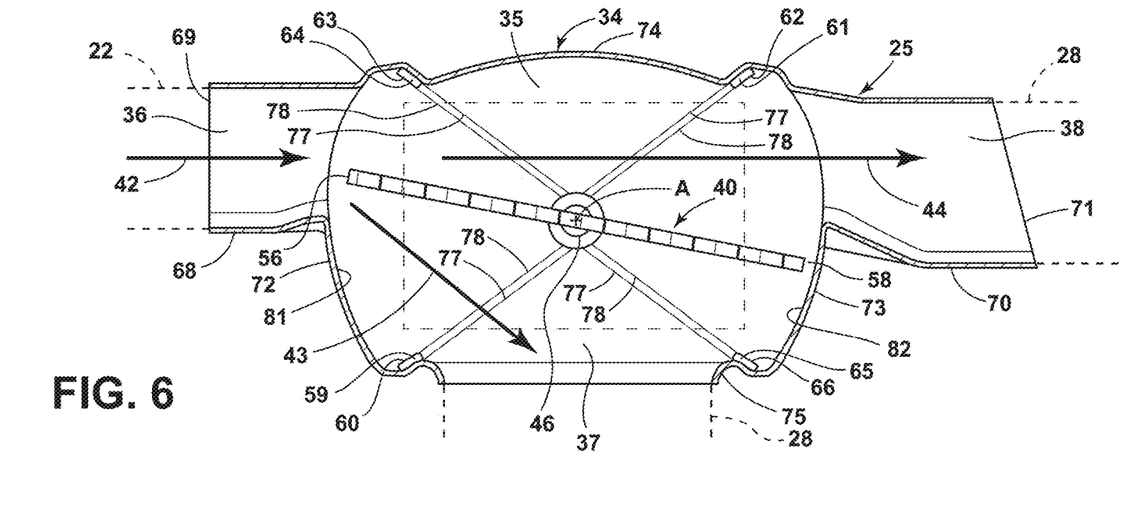
FIG. 6 is a cross-sectional view of the air distribution plenum of FIG. 2 showing the door in a fourth position.
Figure 7:
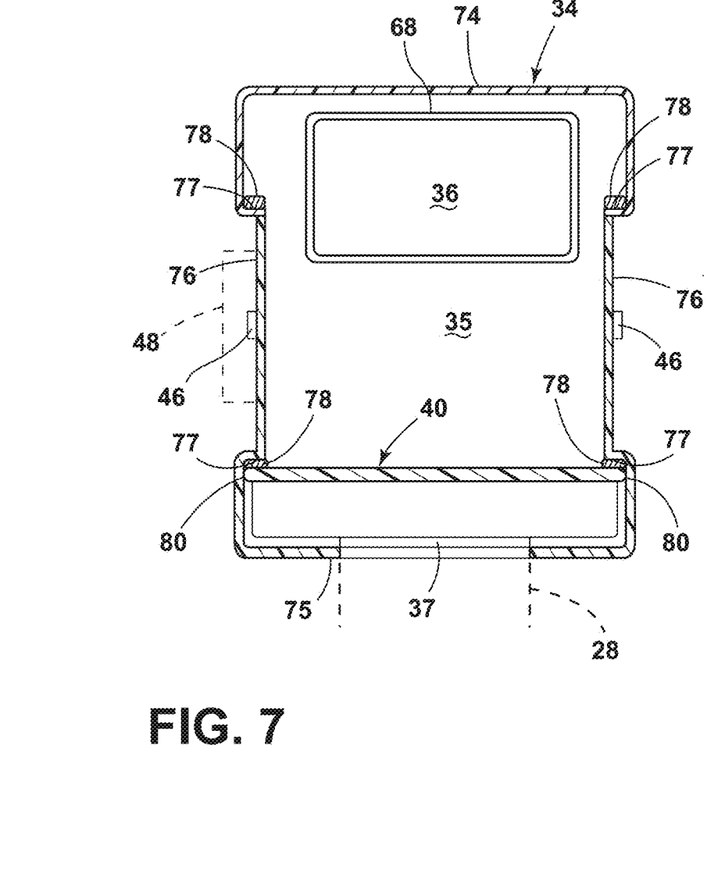
FIG. 7 is a cross-sectional view taken along the line VII-VII of FIG. 3.
Figure 8:
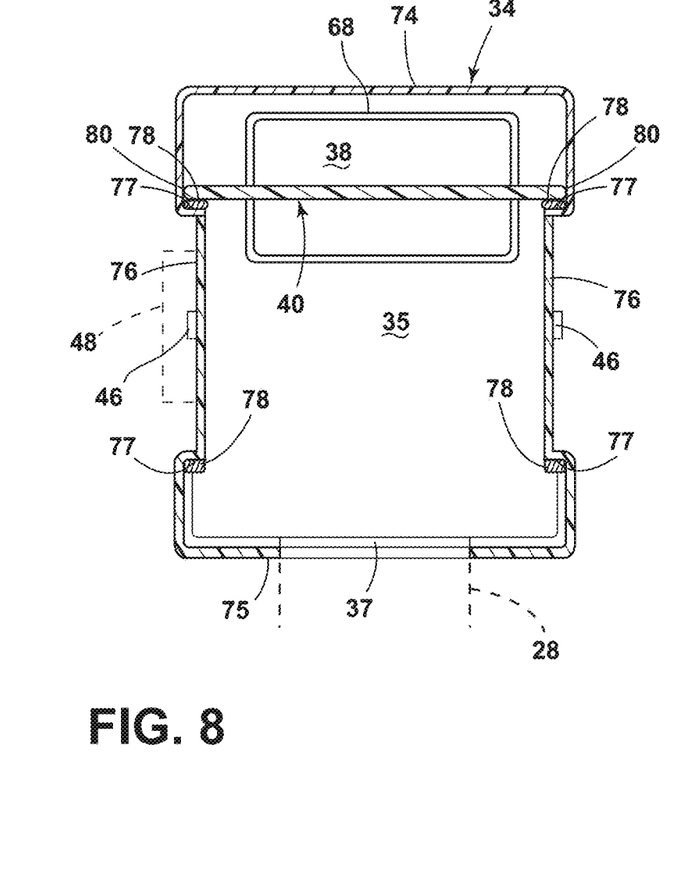
FIG. 8 is a cross-sectional view taken along the line VIII-VIII of FIG. 3.

Referring to FIGS. 3, 7, and 8, housing 34 includes an upstream sidewall 72, a downstream sidewall 73, an upper sidewall 74, and a lower sidewall 75. Housing 34 further includes opposite sidewalls 76 (FIG. 2) that extend between the upstream and downstream sidewalls 72 and 73. The sidewalls 76 include transverse stop surfaces 77 that are configured to engage opposite edge portions 80 of door 40 when the door 40 is in the first position (FIG. 3) and the third position (FIG. 5). Resilient seal strips 78 may be disposed on the transverse surfaces 77 to provide a seal when the door is in the first and third positions.

Referring again to FIG. 3, upstream sidewall 72 of housing 34 includes a concave inner surface 81 that is generally cylindrical, and downstream sidewall 73 of housing 34 includes a concave inner surface 82 that is also generally cylindrical. When door 40 is in the second position (FIG. 4) and/or in an intermediate position between the first and second positions of FIGS. 3 and 4, the leading edge 56 of door 40 is positioned directly against or immediately adjacent the cylindrical inner surface 81, and trailing edge 58 of door 40 is positioned directly against or immediately adjacent cylindrical inner surface 82 of housing 34. The close fit between leading and trailing edges 56, 58 and inner surfaces 81, 82, respectively, prevents or limits air flow around leading or trailing edges 56, 58 when the leading and trailing edges 56, 58 are positioned adjacent surfaces 81, 82, respectively.

Referring again to FIG. 1, in use, HVAC unit 12 may be actuated to provide cold air or hot air to air distribution plenum 25 through second row air duct 22. Air distribution plenum 25 can be shifted to a selected one of the first position (FIG. 3), second position (FIG. 4), third position (FIG. 5), or fourth position (FIG. 6) as required to provide air flow to the panel (upper) outlets 26 or floor outlets 27 of second row 8. In particular, one or more user inputs 84 may be provided at one or more locations within the vehicle interior 3 to provide user input to controller 52. Controller 52 is configured to selectively actuate the electrically-powered drive unit 48 to shift the door 40 between the positions of FIGS. 3-6 as required to provide air flow to one or more vent openings 26A, 26B, 27A, 27B, etc.

The first air outlet opening 37 may be fluidly connected to a pair of ducts 28 to provide air flow to a pair of floor outlets 27 and 27B, and second air outlet opening 38 may be fluidly connected to a pair of air ducts 28 to provide air flow to first and second air outlets 26A and 26B. When configured in this way, both panel outlets 26A and 26B may generally receive equal air flow from second air outlet opening 38, and both floor outlets 27A and 27B may receive substantially equal air flow from first air outlet opening 37. However, it will be understood that one or more of outlets 26A, 26B, 27A, 27B, etc. may include air flow control flaps (not shown) or the like of a known type that can be fully or partially closed to partially or completely block air flow through the outlets 26A, 26B, 27A, 27B.

Figure 9:
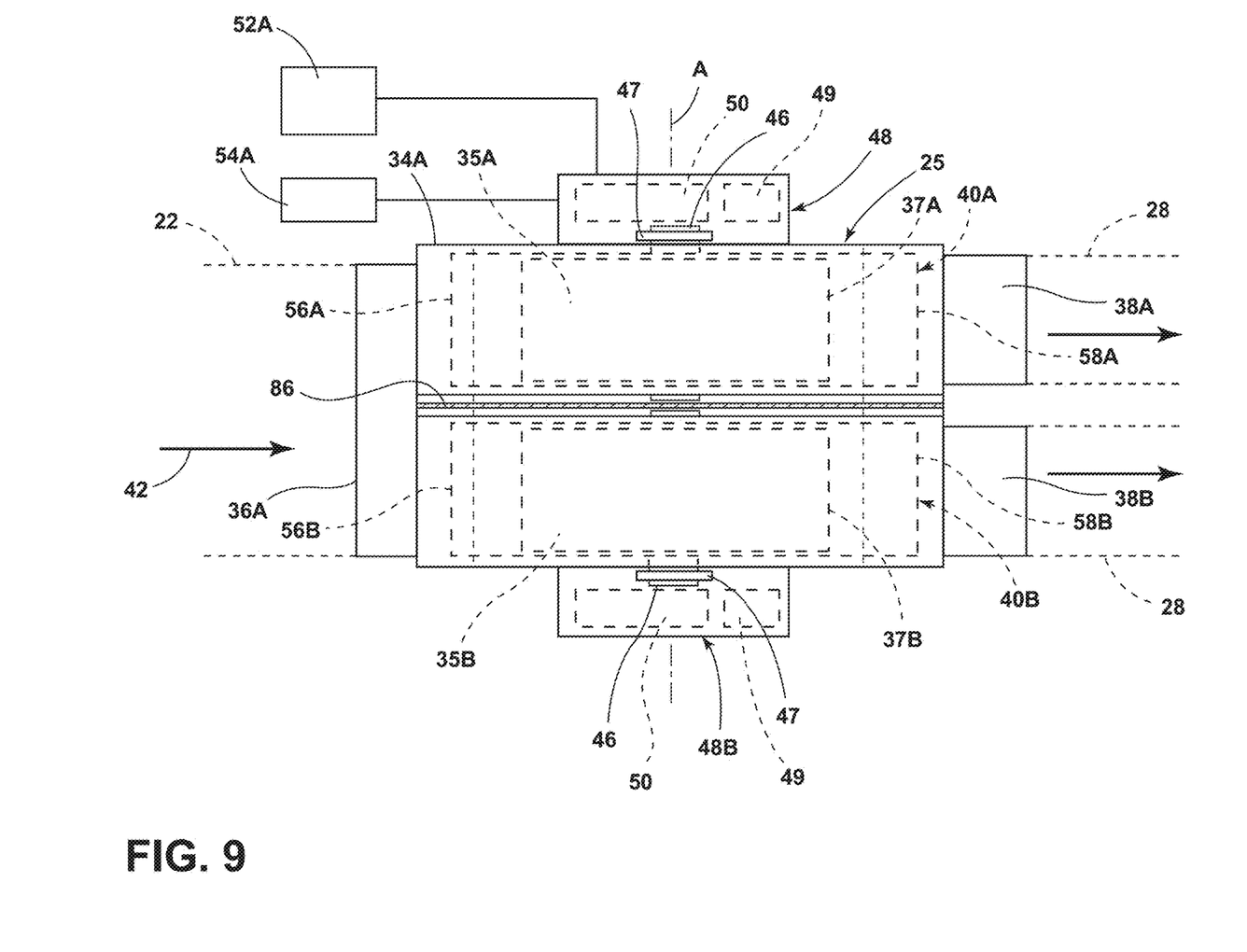
FIG. 9 is a partially schematic top plan view of an air distribution plenum including first and second interior spaces and first and second doors.

With reference to FIG. 9, air distribution plenum 25 may optionally include a housing 34A having a divider wall 86 forming first and second interior spaces 35A and 35B, respectively, that are connected to a single air inlet 36A. Air distribution plenum 25 may include first and second doors 40A and 40B that are selectively shifted to first, second, third, and fourth positions in substantially the same manner as door 40 as discussed in more detail above in connection with FIGS. 3-6. Air distribution plenum 25 includes electric motors 48A and 48B that are operably connected to doors 40A, 40B, respectively, to provide for independent control of doors 40A and 40B. Electric motors 48A, 48B may be operably connected to a controller 52A and a power source (e.g. battery 54A). It will be understood that controller 52A may comprise virtually any suitable processor, circuit, or combination thereof. The doors 40A and 40B can be separately and independently moved to a selected one of the four positions discussed above in connection with FIGS. 3-6. The housing 34A includes two first outlet openings 37A and 37B and two second air outlet openings 38A and 38B, respectively. The outlets 37A, 37B, 38A, and 38B are connected to air ducts 28 to supply air to panel outlets 26A and 26B, and floor outlets 27A and 27B (FIG. 1). Because the doors 40A and 40B can be separately controlled, the air flow to the outlets for the driver and passenger side seats 9 and 10 of second row 8 can be independently controlled. For example, a user in the driver's side seat 9 of second row 8 could utilize input 84 to close off air flow by shifting first door 40A to a first position (FIG. 3), and a user occupying the passenger side seat 10 of second row 8 could simultaneously shift the door 40B to the fourth position (FIG. 6) to provide air flow through both the panel and floor outlets 26B and 27B, respectively, utilizing input 84.

It will be understood that air distribution plenums 25 may be utilized in other applications. For example, if vehicle 1 includes a third row of seating (not shown), duct 22 (or a second duct) may extend to the third row of seating, and another air distribution plenum 25 may be disposed adjacent the third row to supply air to the third row. Also, if vehicle 1 comprises, for example, a truck having one or more climate controlled (e.g. refrigerated) compartments, one or more air distribution plenums 25 may be utilized to control air flow to multiple outlet vents in the climate controlled compartment. Furthermore, it will be understood that vehicle 1 could include a plurality of HVAC units 12 and one or more air distribution plenums 25 could be operably (fluidly) connected to one or more HVAC units 12 as required to provide controlled flow of air to selected air outlets of the vehicle 1.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A ventilation system for motor vehicles comprising:
a HVAC unit configured to provide conditioned air;
a housing having an interior space, an air inlet opening fluidly interconnecting the HVAC unit to the interior space, a first air outlet opening and a second air outlet opening, both being fluidly connected to the interior space and wherein the housing includes an upstream side and a downstream side that is opposite the upstream side, and wherein the air inlet opening of the housing and the first air outlet opening of the housing are disposed on the upstream and downstream sides, respectively, of the housing, and wherein the housing includes an upstream sidewall and a downstream sidewall, a first sidewall, and a second sidewall that is opposite the first sidewall, the first sidewall and the second sidewall both extending between the upstream and downstream sidewalls, wherein both the first sidewall and the second sidewall include stop structures;
a door at least partially disposed in the interior space of the housing, wherein the door is substantially planar, and includes a substantially rectangular peripheral edge and opposite side surfaces adjacent the peripheral edge, and wherein the door is pivotal between first, second, third, and fourth positions and wherein opposite side surfaces of the door adjacent to the peripheral edge of the door engage the stop structures when the door is in the first and third positions to limit rotation of the door;
an electric motor operably connected to the door for moving the door to the first, second, third, and fourth positions, and wherein:
when the door is in the first position, the door substantially blocks air from flowing out of the housing through both the first air outlet opening and the second air outlet opening;
when the door is in the second position, the door substantially blocks air flowing into the air distribution plenum through the air inlet opening from flowing through the first air outlet opening, and fluidly connects the air inlet opening and the second air outlet opening to permit air flowing through the air inlet opening to flow out of the air distribution plenum through the second air outlet opening;
when the door is in the third position, the door substantially blocks air entering the air inlet opening from flowing through the second air outlet opening, and fluidly connects the air inlet opening and the first air outlet opening to permit air flowing through the air inlet to flow out of the air distribution plenum through the first air outlet opening; and when the door is in the fourth position, the door fluidly connects the air inlet opening to the first air outlet opening and the second air outlet opening to permit air flowing into the air distribution plenum through the air inlet to flow out of the air distribution plenum through the first air outlet opening and through the second air outlet opening.

2. The ventilation system of claim 1, wherein:
the first air outlet opening is disposed on a side of the housing transverse to the upstream and downstream sides of the housing.

3. The ventilation system of claim 1, wherein:
the stop structures comprise resilient pads disposed on stop surfaces of the housing.

4. The ventilation system of claim 3, wherein:
the downstream sidewall of the housing includes a concave interior surface disposed between the first air outlet opening and the second air outlet opening;
the downstream edge of the door is positioned directly adjacent the concave interior surface of the downstream sidewall when the door is in the fourth position, and the upstream edge of the door is disposed directly adjacent a central portion of the air inlet opening when the door is in the fourth position, whereby air flowing through the air inlet opening is split, by the door, into a first stream and a second stream of air.

5. The ventilation system of claim 4, wherein:
the concave interior surface of the downstream sidewall of the housing is substantially cylindrical.

6. The ventilation system of claim 1, wherein:
the door comprises a first door;
the electric motor comprises a first electric motor;
the housing further including a second door and a second electrical motor operably connected to the second door;
wherein the housing includes a divider wall dividing the interior space into first and second interior spaces, wherein the first and second interior spaces are fluidly connected to the air inlet opening, and wherein the first air outlet and the second air outlet are both fluidly connected to the first interior space, the housing further including third and fourth air outlet openings fluidly connected to the second interior space;
wherein the first door is disposed in the first interior space;
wherein the second door is disposed in the second interior space;
and wherein the second electric motor is configured to move the second door to first, second, third, and fourth positions to selectively block both the third air outlet opening and the fourth air outlet opening when in the first position, block only the third air outlet opening when in the second position, block only the fourth air outlet opening when in the third position, and permit air flow out through both the third air outlet opening and the fourth air outlet opening when in the fourth position.

7. The ventilation system of claim 6, wherein:
the first and second interior spaces have substantially the same sizes and shapes; and
the first and second doors have substantially the same sizes and shapes.

8. A motor vehicle having a passenger compartment and first and second row seats disposed in the passenger compartment, and a ventilation system comprising:
a HVAC unit configured to provide conditioned air;
an air duct extending from the HVAC unit; and
an air distribution plenum disposed between left and right seats of the first row of seats, the air distribution plenum having an air inlet opening fluidly connected to the air duct and a first air outlet opening and a second air outlet opening, the air distribution plenum including a movable door member that is configured to substantially block both the first air outlet opening and the second air outlet opening when the movable door member is in a first position, block only the first air outlet opening when the movable member is in a second position, block only the second air outlet opening when the movable member is in a third position, and to permit air to flow through both the first air outlet opening and the second air outlet opening when the movable member is in a fourth position, the air distribution plenum including stop structures that limit rotation of the movable door member when the movable door member is in the first and third positions such that the movable door member cannot rotate beyond the first and third positions.

9. The motor vehicle of claim 8, wherein:
the first air outlet opening is fluidly connected to a floor vent that is positioned at a lower height than a panel vent.

10. The motor vehicle of claim 8, including:
an electric motor operably connected to the movable door member;
a controller operably connected to the electric motor, wherein the controller is configured to cause the electric motor to move the movable member to the first, second, third, and fourth positions, at least one forward duct fluidly connected to the HVAC unit for supplying air from the HVAC unit to a front row seat of the motor vehicle; and wherein:
the at least one forward duct is configured to supply air from the HVAC unit to second row vents of the motor vehicle.

11. The motor vehicle of claim 10, wherein:
the air distribution plenum includes a housing having an interior space;
the movable door member comprises a first door;
the electric motor comprises a first electric motor;
the air distribution plenum further including a second door and a second electrical motor operably connected to the second door;
wherein the housing includes a divider wall dividing the interior space into first and second interior spaces, wherein the first and second interior spaces are fluidly connected to the air inlet opening, and wherein the first and second air outlet openings are fluidly connected to the first interior space, the housing further including a third air outlet opening and a fourth air outlet opening, both being fluidly connected to the second interior space;
wherein the first door is disposed in the first interior space;
wherein the second door is disposed in the second interior space;
and wherein the second electric motor is configured to move the second door to first, second, third, and fourth positions to selectively block both the third air outlet opening and the fourth air outlet opening, block only the third air outlet opening, block only the fourth air outlet opening, and permit air flow out through both the third and fourth air outlet openings, respectively.

12. The motor vehicle of claim 11, wherein:
the first, second, third, and fourth air outlet openings are configured to supply air from the HVAC unit to a second row of seats of the motor vehicle.

13. The motor vehicle of claim 8, wherein:
the stop structures comprise resilient pads disposed on stop surfaces of the housing.

14. The motor vehicle of claim 8, wherein:
the air distribution plenum includes an upstream sidewall, a downstream sidewall, a pair of spaced-apart opposite sidewalls extending between the upstream sidewall and the downstream sidewall, an upper sidewall extending between the opposite sidewalls, and a lower sidewall that is spaced apart from the upper sidewall and extends between the opposite sidewalls;
the stop structures comprise transverse surfaces of the opposite sidewalls.

15. The motor vehicle of claim 14, wherein:
the stop structures further comprise surfaces formed on the upper and lower sidewalls.

16. The motor vehicle of claim 15, wherein:
the stop structures further comprise resilient pads.

17. A motor vehicle having a passenger compartment and first and second row seats disposed in the passenger compartment, and a ventilation system including:
a HVAC unit positioned in front of the first row seats;
an air duct extending from the HVAC unit;
an air distribution plenum including a housing, the housing having an air inlet fluidly connected to the air duct and to a first air outlet opening of the housing and to a second air outlet opening of the housing, the air distribution plenum including a movable member disposed inside the housing, wherein the movable member is configured to substantially block both the first and second air outlet openings when in a first position, block only the first air outlet opening in a second position, block only the second air outlet opening in a third position, and permit air to flow through both the first and second air outlet openings when in a fourth position, wherein the housing includes stop structures that limit rotation of the movable member in a first direction when the movable member is in the first position, and limit rotation of the movable member in a second direction that is opposite the first direction when the movable member is in the third position.

18. The motor vehicle of claim 17, wherein:
the motor vehicle includes a center console structure extending through a central portion of the passenger compartment; and
the air duct is disposed in the center console structure, the housing of the air distribution plenum includes four air outlet openings that are fluidly connected to the air inlet, and wherein the air distribution plenum is configured to permit air flow out of only a selected one of the four air outlet openings, any two of the four air outlet openings, any three of the four air outlet openings, and to simultaneously block air flow out of all four air outlet openings, wherein the four air outlet openings include the first air outlet opening and the second air outlet opening.

19. The motor vehicle of claim 17, wherein:
the housing includes an upstream side and a downstream side that is opposite the upstream side, and wherein the inlet opening of the housing and the first air outlet opening of the housing are disposed on the upstream and downstream sides, respectively, of the housing.

20. The motor vehicle of claim 17, wherein:
the stop structures comprise resilient pads disposed on stop surfaces of the housing.

* * * * *

UNITED STATES PATENT AND TRADEMARK OFFICE
CERTIFICATE OF CORRECTION

PATENT NO. : 11,458,809 B2
APPLICATION NO. : 16/524483
DATED : October 4, 2022
INVENTOR(S) : Lewczynski et al.

It is certified that error appears in the above-identified patent and that said Letters Patent is hereby corrected as shown below:

In the Claims

Column 8:
Claim 1, Line 47;
"opposite" should be --the opposite--.
Claim 1, Lines 59-60;
Delete "into the air distribution plenum".
Claim 1, Lines 64-65;
Delete "air distribution plenum" and insert --housing--.

Column 9:
Claim 1, Line 4;
Delete "air distribution plenum" and insert --housing--.
Claim 1, Line 9;
Delete "air distribution plenum" and insert --housing--.
Claim 1, Line 10;
Delete "air distribution plenum" and insert --housing--.
Claim 6, Line 55;
"block" should be --block air from flowing through--.
Claim 6, Line 57;
"block" should be --block air from flowing through--.
Claim 6, Line 58;
"block" should be --block air from flowing through--.
Claim 6, Line 59;
"air flow" should be --air to flow--.

Signed and Sealed this
Thirteenth Day of December, 2022

*Katherine Kelly Vidal*

Katherine Kelly Vidal
*Director of the United States Patent and Trademark Office*